United States Patent Office 3,393,419
Patented July 23, 1968

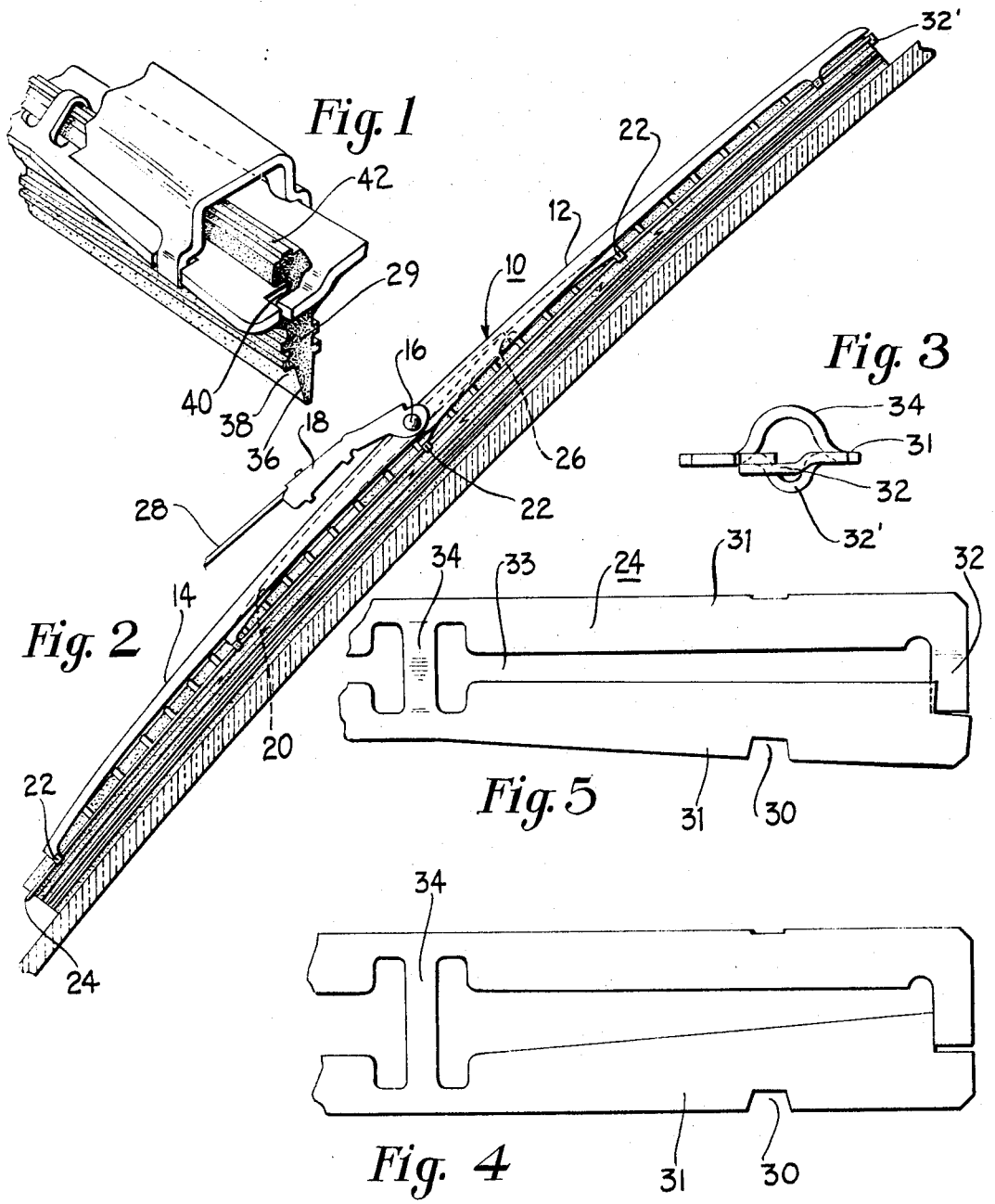

3,393,419
WINDSHIELD WIPER BLADE
Anthony C. Scinta, Hamburg, N.Y., assignor to Trico Products Corporation, Buffalo, N.Y.
Filed Feb. 23, 1966, Ser. No. 529,293
6 Claims. (Cl. 15—250.42)

ABSTRACT OF THE DISCLOSURE

A windshield wiper blade includes a rubber element having a wiping lip portion and a back portion connected by a reduced neck portion which forms longitudinal grooves. A stabilizing backing strip has a pair of side rails formed by a longitudinal notch. The side rails are received on each side of the neck portion. The backing strip is self-latching in that a notch on one side rail engages a claw of a pressure distributing superstructure comprised of a series of articulated levers. Claws on each lever engage the side edges of the backing strip. An unobstructed portion of the slot in the region of the notch permits sufficient flexing to disengage the notch from the claws. A pair of inwardly extending separable bridges at the end of the backing strip overlap to prevent displacement of the rubber. The prestressing of the resilient side rail is achieved by forming an asymmetrical converging inner edge in the region of the notch and in forming the side rail to provide parallel inner edges and a divergent outer edge.

---

The present invention relates to an improved wiper for cleaning the windshield of an automobile and, more particularly, to an improved wiper of the type wherein the wiping element portion of the wiper is replaceable in the superstructure in which it is mounted.

The present refillable wiper blade assemblies utilize separate latching elements which contribute to the cost of labor and materials in the manufacture of wiper blades. Certain types, particularly those of the push button and spring variety, include a multiplicity of elements, negating the obvious economic advantages inherent in refillable elements, to renew the wiping quality without the necessity of replacing the entire wiper blade. Further, it is desirable to provide a refillable element wherein the operative structure is an integral part of the replaceable assembly. Such a construction provides quietness in operation.

The refill element of this invention includes an integral operating latch mechanism which is self-locking, and can be inserted more readily in conventional wiper blade superstructures.

The principal object of the present invention is to provide a quiet, self-locking, self-contained blade rubber and backing strip refill element which is economical and simple to manufacture and usable without adding parts to the wiping assembly or the wiper blade superstructure.

Other objects and advantages of the invention will be apparent from the following detailed description taken in connection with the accompanying drawings in which:

FIG. 1 is a partial perspective view of a wiper blade superstructure and refill element in its operative position;

FIG. 2 is a side elevational view of the wiper blade of this invention;

FIG. 3 is an end view of the backing strip utilized in the refill element of this invention showing the operating structure;

FIG. 4 is a top elevational view of the backing strip utilized in the rubber element of this invention and an intermediate stage in manufacturing; and FIG. 5 is a partial top elevational view illustrating the large operating end of the backing strip.

Briefly, the invention comprises a conventional superstructure having blade straddling claws with an arm receiving clip mounted substantially thereof; and a replaceable wiping assembly incorporating a rubber-like element and a surface conforming backing strip. The rubber-like element comprises a wiping lip, a body portion and a retaining head or back portion separated from the body portion by a relatively thin neck. The neck forms lateral longitudinal slots between the back and the body portion. The backing strip includes a central longitudinal slot beneath a series of bridges extending across a pair of substantially parallel side rails. The central slot receives the relatively thin neck. At one end the backing strip is closed by an inverted bridge and at the other by a separable transverse strip. At this latter end, at least one of the side rails is biased outwardly and has a diverging edge forming a cam surface. The diverging portion includes a notch for receiving a claw of the superstructure to retain the refill element in operative position within the superstructure.

The wiper blade of FIG. 1 includes a superstructure 10 consisting of channel-shaped levers 12 and 14 which are pivotally connected at their adjacent ends by a rivet 16 which also pivotally supports an arm receiving clip 18 of any suitable or conventional type. A secondary lever 20 is pivotally supported intermediate its ends on the rivet 16. The outer ends of the levers 12 and 14 are formed into fingers or blade straddling claws 22 which slidably engage opposite edge portions of flexible backing strip 24. One end of secondary lever 20 is also formed into fingers or claws 22 which slidably engage opposite edges of the backing strip 24 intermediate the center and one portion thereof. At its other end, secondary lever 20 is pivotally connected to a yoke-like lever 26. Yoke-like lever 26 has its opposite ends formed into fingers or claws 22 which slidably engage opposite edges of the backing strip at spaced points intermediate the ends of the backing strip. A spring (not shown) encircles rivet 16 and biases levers 12 and 14 in a clockwise and a counterclockwise direction, respectively, when viewed from FIG. 2.

Thus, as illustrated, by way of example, five sets of fingers or claws 22 are provided for slidably engaging opposite edge portions of flexible backing strip 24 for transmitting pressure from wiper arm 28 to the rubber blade or wiping element 29 carried by the backing strip 24. However, the finger or claw 22 adjacent one end of the blade engages a notch 30 in the backing strip for anchoring the blade and backing strip assembly to the superstructure. It will, of course, be understood that any suitable type of superstructure incorporating various arrays of levers and yokes may be utilized.

The backing strip 24 is formed from a flat strip of flexible material and includes a longitudinal substantially central slot which extends from a point adjacent one end of the strip to a point adjacent the other end of the strip dividing the backing strip into a pair of side rails 31 having bridges 32 and 32' at its ends. At the end adjacent the notch 30 is the bridge 32 which is sheared so as to be separable from one of the side rails 31. The bridge 32 is offset downwardly so that it can underlie the opposite rail 31 when the rails are drawn toward each other, thereby permitting free lateral movement of the side rails. The bridge 32' is arched downwardly. Thus, bridges 32 and 32' serve to prevent displacement of the rubber element 29 relative to the backing strip 24. Intermediate the end bridges, there are a plurality of intermediate bridges 34 longitudinally spaced apart. The outer edge of the side rail 31 which includes a notch 30 diverges laterally outwardly from a point adjacent the end of the backing strip, but interiorally of the notch 30 to the adjacent outer end of the side rail 31. The side walls of notch 30 diverge toward the open end for a purpose to be explained hereinafter.

The rubber element or blade 29 includes a wiping lip 36 which extends downwardly from central portion or body portion 38. A reduced neck portion 40 is adapted to fit within slot 33 of the flexible backing strip 24 and an enlarged back portion 42 of the wiping element is located above slot 33. The arched bridges or ribs 34 overlie and straddle the back portion 42. The bridges 32 and 32' at the ends of the backing strip 24 prevent longitudinal displacement of the wiping element 29 relative to the backing strip 24.

In order to facilitate manufacturing, to conserve material and to provide the necessary resilience for the function of the latch operating end of the backing strip, the strip is initially cut from flat material to form parallel edges on each side of the strip and a tapered edge at one side of the slot. The tapered edge forms an asymmetrical converging slot region. Utilization of the parallel edges and tapered slot permits the shearing of a large number of backing strips from strip stock utilizing a progressive die mechanism which perforates to provide bridge members which are arched between the opposite two flat side rails, at the same time shearing and offsetting the bridge 32. Likewise, the side rail 31 which is tapered along the inner edge of the slot adjacent the notch is formed outwardly to provide an outer tapered or cam surface adjacent the notch 30. The side rail 31 thus is biased outwardly in the region of the notch 30. The product of the initial or intermediate punching operation is illustrated in FIG. 4. FIG. 5 illustrates the backing strip after it has been formed to its final configuration. In its final form the edges of slot 33 may diverge slightly adjacent the separable end. This forming operation causes the operating end of the side rail 31 to be biased outwardly. The rubber wiping element 29 and the backing strip 24 are then assembled as a self-locking refillable wiping element unit. Wiping unit 29 can then be assembled with the superstructure 10 by sliding the rails through the claws 22 until the tapered portion of the rail 31 engages the outermost claw of lever 14. The claw moving along the tapered edge cams the side rail inwardly until the notch 30 engages the claw, at which time the resilience of the rail 31 at this point, together with the diverging edges of the notch, retains the claw 22 and notch 30 in secure engagement. The slight divergence of slot 33 facilitates the camming action as the refill unit is assembled in the superstructure. The divergence of the edges of the notch 30 compensates for variations in the dimensions of the blade straddling claw 22 and insures a secure engagement. This obviates looseness and insures quietness when the wiper is operating.

The refill unit can easily be removed by depressing the side rails 31 together adjacent the notched end and exerting a slight twisting force which causes the notch 30 to disengage from the claw 22, permitting easy removal and replacement.

A unique blade utilizing a notched backing strip construction has been provided with the operative latching construction fully contained in the expendable refill element so that no added parts are required for retaining the refill unit in interlocked relation with the blade superstructure.

It should now be apparent that an improved and effective refillable blade has been provided. A certain specific embodiment of the invention has been described for the purpose of illustration, but it will be apparent that various modifications and other embodiments are possible within the scope of the invention. It is to be understood therefore that the invention is not limited to the specific arrangement shown, but in its broadest aspects it includes all equivalent embodiments and modifications which come within the scope of the invention.

What is claimed is:

1. A windshield wiper comprising in combination with an arm pressure distributing superstructure having blade straddling claws, a wiping assembly comprising a blade of rubber-like material having a wiper portion and a back portion, a surface conforming backing strip provided with a longitudinal slot forming a pair of substantially parallel side rails, said back portion being mountable in said longitudinal slot, at least one of said side rails having engaging means formed therein for retaining said wiping assembly in said superstructure adjacent an end thereof, said slot being closed at its ends but separable at one end adjacent said engaging means, said one side rail being biased outwardly and movable inwardly in the region of said engaging means, said engaging means being disposed for secure engagement with a cooperating portion of said superstructure when said side rail is in its outwardly biased condition.

2. A windshield wiper according to claim 1 wherein said engaging means is a notch disposed on an edge of one of said side rails and located for secure engagement with a claw of said superstructure.

3. A windshield wiper according to claim 2 wherein camming means are provided on said side rail adjacent said notch for cooperation with a claw to overcome said outwardly biased condition of said side rail while said notch is slid into engagement with said claw.

4. A windshield wiper according to claim 3 wherein said one of said closed ends comprises overlapping transverse ribs which are movable transversely relative to each other.

5. A windshield wiper comprising in combination with an arm pressure distributing superstructure having blade straddling claws, a blade of rubber-like material having a wiping portion and a back portion, a surface conforming backing strip provided with a longitudinal slot formed from a strip of material having parallel sides and a longitudinal slot converging asymmetrically at one end toward the end of said backing strip and engaging means in the region of said converging portion of said slot, the edges of said slot being brought into substantial parallelism at its converging end to provide an asymmetrical diverging outer edge on said backing strip forming a cam surface adjacent the region of said engaging means, a cooperating camming surface on said superstructure thereby providing an outwardly biased portion of greater width in the region of said engaging means movable inwardly when said cam edge engages a cooperating surface of said superstructure.

6. A method for manufacturing a refill unit for a windshield wiper blade including a backing strip and a rubber element; the method comprising forming a rubber-like element having a wiping lip along one longitudinal edge and a back portion along the other longitudinal edge, forming a backing strip having parallel longitudinal outer edges and a central slot having parallel edges and an asymmetrical converging edge adjacent its end, the slot being closed at its ends by transverse strips, shearing one of said transverse strips to render said one transverse strip at the end adjacent the asymmetrical converging edge of the slot separable, displacing the converging edge to parallelism with the opposing edge of the slot, thereby forming a diverging edge on the backing strip, forming a notch in the diverging edge of the backing strip and inserting the back portion of the rubber-like element in the longitudinal slot, whereby an outwardly biased camming surface is formed on a side rail in the region of the notch.

References Cited

UNITED STATES PATENTS

| Re. 24,974 | 4/1961 | Krohm | 15—250.42 |
| 2,687,544 | 8/1954 | Scinta | 15—250.42 |
| 3,018,500 | 1/1962 | Anderson | 15—250.42 |
| 3,076,993 | 2/1963 | Anderson | 15—250.42 |

CHARLES A. WILLMUTH, *Primary Examiner.*

R. I. SMITH, *Assistant Examiner.*